UNITED STATES PATENT OFFICE.

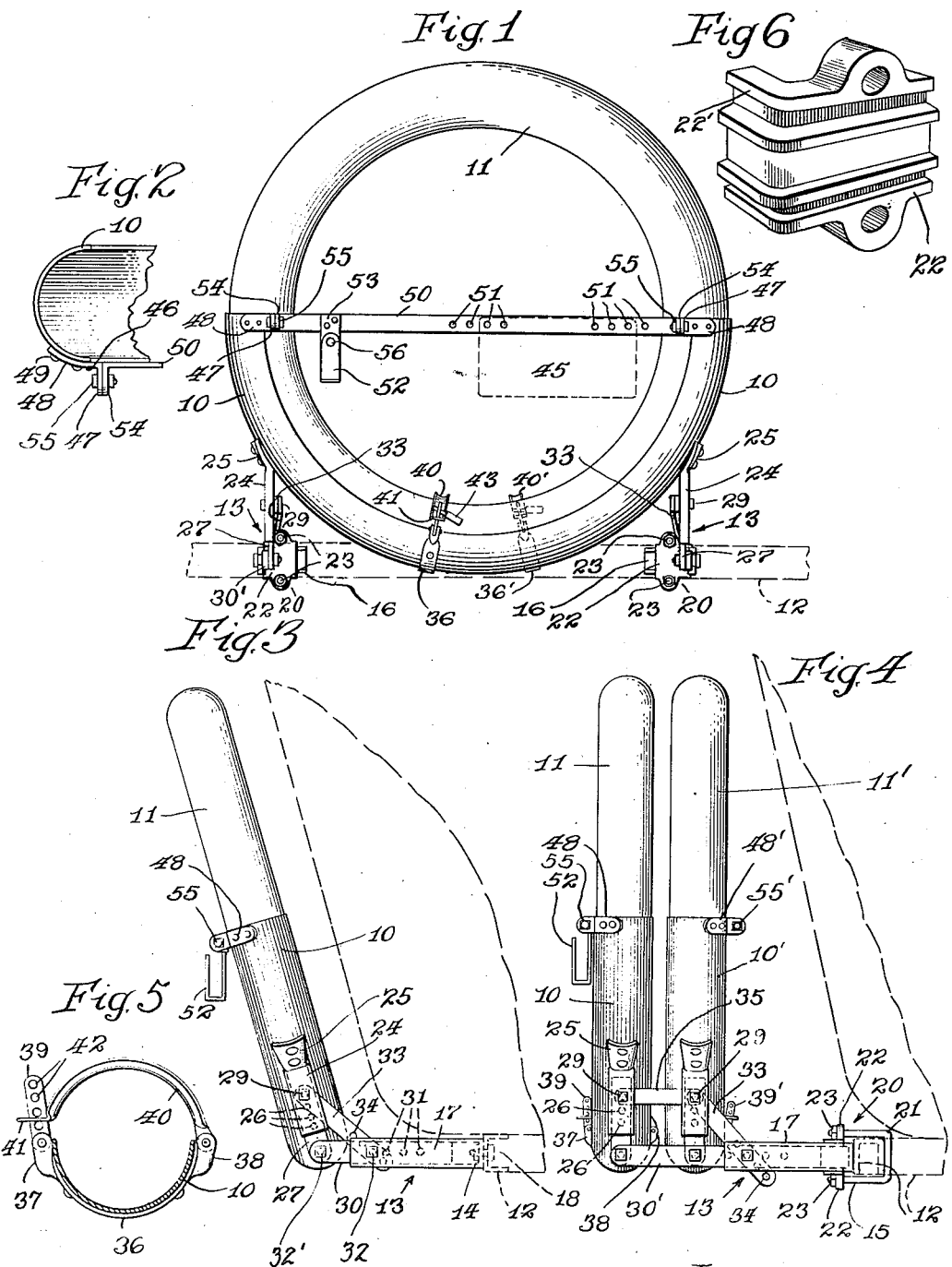

LULOFF WILSON, OF CHICAGO, ILLINOIS.

TIRE-CARRIER.

1,327,261.  Specification of Letters Patent.  Patented Jan. 6, 1920.

Application filed June 21, 1917. Serial No. 176,160.

*To all whom it may concern:*

Be it known that I, LULOFF WILSON, a citizen of the United States, residing at Chicago, in the county of Cook and State of Illinois, have invented certain new and useful Improvements in Tire-Carriers, of which the following is a specification.

My invention relates to carriers for spare tires for vehicles, such as automobiles or the like.

One of the objects of my invention is to provide a tire carrier for easy attachment, preferably, to the rear portion of the frame of an automobile and adapted for one or more spare tires and arranged to permit adjustment of the holders at any desired angle of inclination.

Another object of my invention is to provide supports, on the tire carrier, for the tail light and license tag of the vehicle, that are readily adjustable to position the license tag in a vertical plane when the characteristics of the vehicle construction are such as to require the tires to be supported in angularly disposed planes.

Other and further objects of my invention will become readily apparent, to persons skilled in the art, from a consideration of the following description when taken in conjunction with the drawings, wherein:—

Figure 1 is an end elevation of a tire carrier showing a tire in place therein.

Fig. 2 is an enlarged plan view of one end of one of the tire receptacles shown in Fig. 1.

Fig. 3 is a side elevation of a carrier for one casing only showing it deflected at an angle to the vertical, owing to the angular arrangement of the rear portion of the vehicle body.

Fig. 4 represents a side elevation of the tire holders shown in Fig. 1, the tires and holders being shown in a substantial practical plane.

Fig. 5 is an enlarged section through the holder showing the means for locking the tire in place.

Fig. 6 is a perspective view of a clamping block.

In all the views the same reference characters are employed to indicate similar parts.

The holder consists of a substantially, semi-circular segment 10 of sheet metal having a semi-circular cross section and adapted to receive and support a spare tire casing 11. The ring segment is adapted for support on the rear portion 12 of the vehicle frame, or chassis, by brackets indicated in general at 13, secured either directly by bolting, as at 14, or by clamping, as at 15. The bracket, which may be a channel iron bar, is provided with one leg 16 adapted to lie in contact with the rear cross member 12 of the vehicle frame, and another leg 17 disposed at right angles thereto and to which the tire holder is secured. The leg members 16 may be secured to the frame member 12 by bolts 18 that pass through both members or by stirrups 20 consisting of the U-shaped clips 21, which are threaded on their free ends and pass around the frame member 12 and through perforated ears in the plates 22 which are clamped by nuts 23 against the channel side of legs 16. Each plate 22 is grooved to fit over the flanges of bracket 16 and has a projecting wing 22' similarly flanged for reinforcing the corner joining parts 16 and 17 of the bracket. On each side of the segment or holder 10 are downwardly extending legs 24, which are preferably of channel iron formation, flattened, as at 25, for connection to the segment, by rivets, or the like. Slidable on the leg 24 within the channel is a flat bar 27, having perforations 26 for register with a hole in the leg so that the parts 24 and 27 may be adjustably connected together by a bolt 29. A longitudinally-extending bar 30 slidable in the bracket channel 17 is provided with a plurality of perforations 31, for adjustable register with a hole in the bracket member 17 whereby the two parts may be secured together by the bolt 32. The outer end of bar 30 is connected by bolt 32' with the lower end of leg bar 27. An angularly disposed brace bar 33 has a series of perforations, as at 34, through any one of which the bolt 32 may pass, and is perforated at the other end for engagement by the bolt 29. The angularly disposed brace supports the holding segment 10 in any desired angular position. The horizontally disposed member 30 may be longitudinally adjusted in the member 17 by placing the bolt 32 in any of the selected holes in the said members. When two or more tire holders are to be carried by the bracket a somewhat longer horizontal bar is used as indicated at 30' in Fig. 4 the two holders 10, 10' being carried on the extended bar. When two or more holders are supported on the same bracket I prefer to connect their vertical legs together by link 35 secured in place by the bolts 29, 29, as clearly shown in Fig. 4.

To lock the tires in place in the holder I prefer to secure, to a portion of the holder 10, a semi-circular strap 36, having hinge members 37 and 38, one at each end, the member 37 having pivoted thereto a perforate link 39, and the member 38 having pivoted thereto a semi-circular strap 40, which overlies the tire 11 when the latter is in place in the holder, and which is provided on its free terminal end 41 with a slot to receive the link 39. The perforations 42 in link 39 are designed to receive the pad lock 43 which may be placed in any of these openings to accommodate different sizes of tires. To remove the tire it is only necessary to remove the lock and swing the member 40 back on its hinge 38. To provide means for supporting a tail lamp and license tag 45, I secure on one side of each end of the segment 10 a clip 46 having an outwardly extended perforated portion 47 and an angularly disposed portion 48 secured to the segment 10, as by rivets or the like, 49.

Pivoted between the clips is a transversely extending bar 50, out-turned at its ends 54, for connection by means of bolts 55 with the legs 47 of the clips. The bar 50 is provided with a series of perforations 51, to which the license tag 45 is secured. It is also provided with a lamp bracket 52, secured thereto, as at 53. By this means, the tag 45 and the lamp to be supported on the bracket 43, may occupy a vertical plane when the tire holder, with the tire contained therein is located angularly divergent from the perpendicular plane, as shown in Fig. 3. The tail lamp bracket 52 is perforated near its upper end, as at 56, to receive a pad lock, or the like, to hold the lamp so that it cannot be removed from its support by unauthorized persons.

While I have herein shown a single embodiment of my invention, for the purpose of clear disclosure, it is manifest that many changes may be made in the general form and arrangement of the parts within the spirit and scope of the appended claims.

Having described my invention, what I claim is:

1. In combination a semi-circular ring segment; downwardly extending supporting legs secured to opposite sides thereof; supporting bars; other bars for connection to a vehicle adjustably secured to said supporting bars; vertically extending bars connected to said supporting bars and adjustably connected to said legs; and angularly disposed braces adjustably connected to said legs and to the said supporting bars, whereby said segment may be positioned vertically or at an angle to the vertical.

2. A spare tire carrier comprising a ring segment semi-circular in cross section to receive a tire casing; vertically disposed legs secured, one to each side of the segment; longitudinally adjustable legs to adjust the effective lengths of said first mentioned legs; a horizontally disposed bar on each side of the segment to which the lower end of the composite legs are connected, respectively; an angularly disposed brace, adjustably connecting the composite leg and bar, on each side of the segment, and a pair of brackets, each having an arm with respect to which each said bar is longitudinally adjustable and means to secure the bracket to a vehicle.

3. A tire carrier comprising a semi-circular ring segment; means for adjustably supporting the same on the rear of a motor vehicle, a clip member secured to each end of said segment, each clip having an out-turned end portion provided with an aperture, a bar extending across said segment and having out-turned ends, each provided with an aperture and fitting within said out-turned ends of said clips, means passing through said alined apertures for frictionally connecting said bar to said clip, whereby the bar may be adjusted to a substantially vertical position regardless of the position of the ring segment, said bar being provided with means for supporting a license plate and also a tail light.

4. A tire carrier comprising a semi-circular ring segment having a leg member depending from each side thereof, a vertical bar adjustably connected to each leg, a bracket member adapted to be connected to each side of a vehicle, a longitudinally extending bar adjustably connected to each bracket member, one being pivotally connected to each leg and an angular brace member pivotally connected to each leg and each bracket.

5. A tire carrier comprising a semi-circular ring segment having a channel shaped leg depending therefrom on each side thereof, a vertical bar adjustably connected to each leg, a channel shaped bracket member adapted to be connected to each side of the vehicle, a longitudinally extending bar adjustably connected to each bracket member and pivotally connected to each leg and an angular brace member pivotally connected to each leg and each bracket.

In testimony whereof I hereunto set my hand.

LULOFF WILSON.